(12) United States Patent
Bailey

(10) Patent No.: US 6,654,228 B1  
(45) Date of Patent: *Nov. 25, 2003

(54) ENERGY STORAGE DEVICE HAVING DC VOLTAGE CONVERTER

(75) Inventor: John C. Bailey, Columbia Station, OH (US)

(73) Assignee: Eveready Battery Company, Inc., St. Louis, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/521,039

(22) Filed: Mar. 8, 2000

(51) Int. Cl.$^7$ .................................................. H01G 9/00
(52) U.S. Cl. ................... 361/502; 361/503; 361/504; 361/508; 361/512; 429/90; 429/92
(58) Field of Search ........................ 429/90, 92, 7, 429/8; 361/502, 511, 315, 316, 317, 325, 326, 327, 503, 504, 508, 512

(56) References Cited

U.S. PATENT DOCUMENTS

| | | | | |
|---|---|---|---|---|
| 3,705,411 A | * | 12/1972 | DeSteese | 174/17 |
| 3,880,192 A | * | 4/1975 | Denizov et al. | 137/827 |
| 4,121,115 A | | 10/1978 | de Méré | |
| 4,296,461 A | * | 10/1981 | Mallory et al. | 363/22 |
| 4,563,627 A | | 1/1986 | Orban | |
| 5,063,340 A | | 11/1991 | Kalenowsky | |
| 5,340,662 A | * | 8/1994 | McCarter | 429/9 |
| 5,486,277 A | | 1/1996 | Barbee, Jr. et al. | |
| 5,498,951 A | | 3/1996 | Okamura et al. | |
| 5,532,572 A | | 7/1996 | Okamura | |
| 5,604,426 A | | 2/1997 | Okamura et al. | |
| 5,642,027 A | | 6/1997 | Windes et al. | |
| 5,645,949 A | * | 7/1997 | Young | 429/7 |
| 5,675,232 A | | 10/1997 | Koenck | |
| 5,710,699 A | | 1/1998 | King et al. | |
| 6,074,775 A | * | 6/2000 | Gartstein et al. | 429/53 |

OTHER PUBLICATIONS

Power Integrations, Inc., "RD1 TOPSwitch® Reference Design Board," Dec. 1995, pp. 2–131 through 2–141.
Maxim Integrated Products, "5V/3.3V or Adjustable, 100% Duty–Cycle, High Efficiency, Step–Down DC–DC Controllers," pp. 1–7, Jun. 1996.
Capattery™ product literature, Evans, East Providence, Rhode Island, 12 pages. No Date.

(List continued on next page.)

Primary Examiner—Dean A. Reichard
Assistant Examiner—Nguyen Ha
(74) Attorney, Agent, or Firm—Russell H. Toye, Jr.

(57) ABSTRACT

According to a first embodiment of the present invention, a self-contained portable energy storage device is disclosed that includes a housing having first and second external contact terminals, a high-energy storage capacitor disposed in the housing and coupled between first and second internal terminals, and a voltage converter disposed in the housing and coupled to the first and second internal terminals. The voltage converter is also coupled to the first and second external contact terminals to convert the voltage appearing at the first and second internal terminals to a substantially constant voltage that the voltage converter applies to the first and second external contact terminals.

A second embodiment of the present invention pertains to a primary battery that includes a housing having first and second external contact terminals, at least one primary electrochemical cell disposed in the housing and electrically coupled between a first terminal and a second terminal, and a voltage converter disposed within the housing. The voltage converter is coupled to the second terminal and is coupled between the first terminal and the first external contact terminal for converting the voltage applied to the first and second terminals by the primary electrochemical cell to a substantially constant voltage that the voltage converter applies between the first and second external contact terminals.

18 Claims, 9 Drawing Sheets

OTHER PUBLICATIONS

Miller, John R., "Performance Expectations of Double Layer Capacitors in Demanding Applications," JME, Inc., Dec. 11, 1991.

Evans, David A., "High Reliability Double Layer Capacitor," The Evans Company, Mar. 28, 1990.

Evans, David A., "Gas Generation in Carbon Double Layer Capacitors," The Evans Company, 7 pages. No date.

Evans, David A. et al., "Capattery Double Layer Capacitor Life Performance," 6 pages, 1991.

Miller, John R. et al., "Design and Performance of High–Reliability Double–Layer Capacitors," 9 pages, May 21, 1990.

* cited by examiner

| Capacitor | Dielectric Constant | Dielectric Thickness | Area | Expected Capacitance | Capacitance/ Unit Volume | Voltage to Equal AA Energy Density | Voltage to Equal Li-ion Energy Density |
|---|---|---|---|---|---|---|---|
| #1 | 3 | 500 nm | 1 | 53.1 uF | 106 uF/cc | 7.77 kV | 6.05 kV |
| #2 | 3 | 200 nm | 1 | 133 uF | 664 uF/cc | 3.11 kV | 2.42 kV |
| #3 | 1100 | 850 nm | 1 | 11.5 mF | 13.5 mF/cc | 690 V | 637 V |
| #4 | 100 | 200 nm | 1 | 4.43 mF | 22.1 mF/cc | 539 V | 419 V |
| #5 | 3000 | 200 nm | 1 | 133 mF | 664 mF/cc | 98.5 V | 76.7 V |
| #6 | 6000 | 50 nm | 1 | 1.06 F | 21.2 F/cc | 18.1 V | 14.4 V |

ENERGY STORAGE DEVICE HAVING DC VOLTAGE CONVERTER

BACKGROUND OF THE INVENTION

The present invention generally relates to self-contained portable energy storage devices, such as electrochemical cells. More particularly, the present invention relates to primary alkaline batteries and battery packs and also to alternative forms of energy storage devices.

Many of today's electronic devices, such as toys, radios, flashlights, etc., are powered using self-contained portable energy storage devices. Due to their high-energy storage density, batteries and battery packs have dominated the self-contained energy storage device market. Such batteries and battery packs are either primary or secondary (e.g., rechargeable).

In the primary battery market, there is an ever-present demand for longer lasting batteries. In the secondary battery market, there exists demands for increased cycle life, decreased charging times, and the ability to design secondary battery packs that are either smaller than current designs or allow for a more flexible shaping of the battery pack for use in connection with video cameras, cellular telephones, personal electronic organizers, and laptop computers that are increasingly being made smaller.

SUMMARY OF THE INVENTION

Accordingly, it is an aspect of the present invention to provide a self-contained portable energy storage device that meets the above-identified market demands. More particularly, it is an aspect of the present invention to provide a rechargeable energy storage device having a virtually unlimited cycle life. It is another aspect of the present invention to provide a rechargeable self-contained energy storage device that may be recharged to its full potential in a fraction of the time taken to recharge conventional secondary battery packs. An additional aspect of the present invention is to provide a rechargeable self-contained energy storage device that may be configured into a wider variety of shapes and sizes than can be achieved with conventional rechargeable battery packs.

To achieve these and other aspects and advantages, the self-contained portable energy storage device of the present invention comprises a housing having first and second external contact terminals, a high-energy storage capacitor disposed in the housing and coupled between first and second internal terminals, and a voltage converter disposed in the housing and coupled to the first and second internal terminals. The voltage converter is coupled to the first and second external contact terminals to convert the voltage appearing at the first and second internal terminals to a substantially constant voltage that the voltage converter applies to the first and second external contact terminals.

Another aspect of the present invention is to provide a primary battery having increased service life. To achieve this and other aspects and advantages, the primary battery of the present invention comprises a housing having first and second external contact terminals, at least one primary electrochemical cell disposed in the housing and electrically coupled between a first terminal and a second terminal, and a voltage converter disposed within the housing. The voltage converter is coupled to the second terminal and is coupled between the first terminal and the first external contact terminal to convert the voltage applied to the first and second terminals by the primary electrochemical cell to a substantially constant voltage that the voltage converter applies between the first and second external contact terminals.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1A:
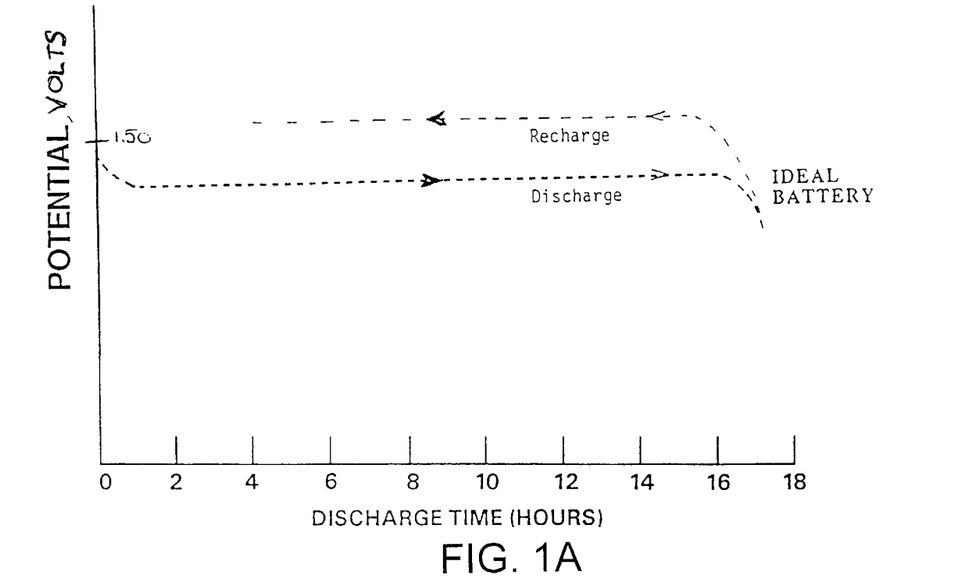
FIG. 1A is a graph showing a charge/discharge curve for an ideal conventional rechargeable battery.
Figure 1B:
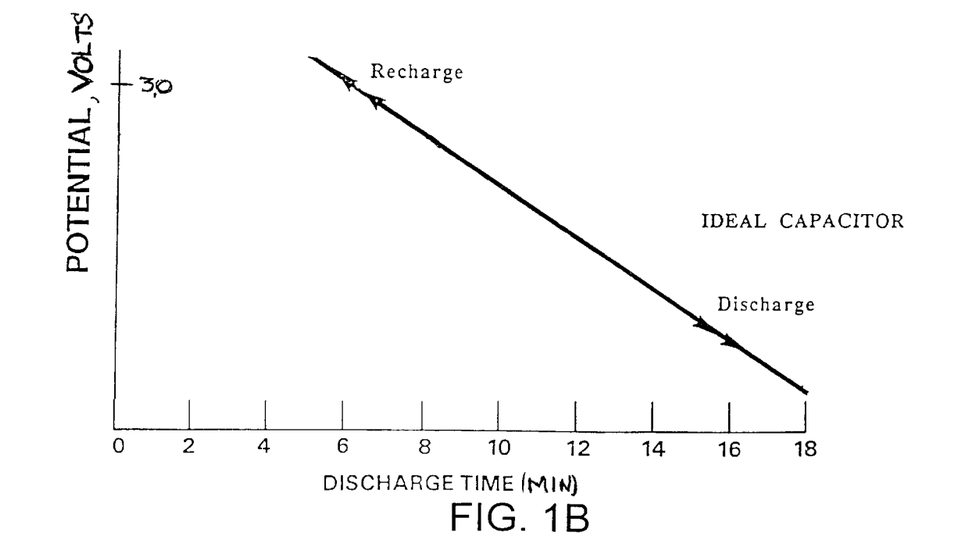
FIG. 1B is a graph showing a discharge curve of an ideal conventional capacitor.

FIG. 1A is a plot showing the voltage as a function of time of an ideal rechargeable battery. FIG. 1B is a plot of the voltage versus time showing the discharge of an ideal capacitor. A capacitor may be charged to a much higher voltage level much more quickly than a rechargeable battery, but discharges very rapidly as will be apparent from a comparison of FIGS. 1A and 1B. A rechargeable battery, on the other hand, discharges much more slowly without exhibiting such an extreme voltage variation. As explained in further detail below, conventional capacitors do not have nearly the energy storage density of a conventional rechargeable battery. To even come close to having an equal energy storage density of a Li-ion rechargeable battery, a capacitor would need to be charged in excess of 6 kV. AA alkaline cells have average open circuit voltages of 1.3 volts and Li-ion cells have average voltages of 3.35 volts. The battery-powered devices in which these batteries are intended to be used are designed to operate at a relatively narrow range of voltages about these values. Because devices powered by batteries are not capable of handling voltages of 6 kV nor handling such extreme voltage swings, the use of capacitors as an alternative energy storage device to rechargeable batteries had not been seriously considered in the energy storage device art.

As described below, the present invention overcomes the above problems by utilizing a voltage converter that converts the DC voltage output from a high-energy storage capacitor into a substantially constant DC voltage falling within the voltage ranges at which battery-powered devices are designed to operate. Voltage converters are now commercially available that can convert variable voltages of between 370 and 104 volts to constant voltages of 5 volts. Further, such voltage converters can be implemented in a relatively small integrated circuit that can be readily integrated into a battery pack-sized housing. An example of such a voltage converter is the RD1 TOPSWITCH® Step-Down converter available from Power Integrations, Inc.

Figure 2:
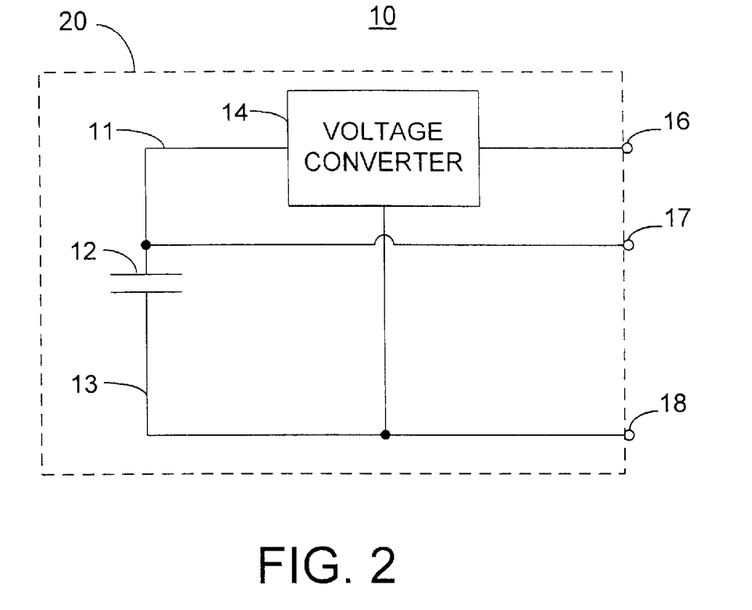
FIG. 2 is an electrical circuit diagram in block and schematic form illustrating an energy storage device constructed in accordance with the first embodiment of the present invention.

A rechargeable energy storage pack constructed in accordance with a first embodiment of the present invention is shown in FIG. 2. Energy storage pack 10 includes a thin film multi-layer super capacitor 12 having two internal terminals 11 and 13. As used herein, the term "high-energy storage capacitor" is used to refer to capacitors for storing high energy levels. Such high-energy storage capacitors include what are known as super capacitors as well as multi-layer thin film dielectric capacitors. Super capacitors include double layer or electrochemical double layer capacitors, which are currently used for memory backup and more recently with pulse smoothing. The multi-layer thin film dielectric capacitors are described in more detail below.

Energy storage pack 10 further includes a voltage converter 14 coupled to both internal terminals 11 and 13 and having an output coupled to an external contact terminal 16. Internal terminal 13 is preferably directly coupled to a second external contact terminal 18. High-energy storage capacitor 12 may be implemented using any of the high-energy storage capacitors described below with reference to FIG. 4. Voltage converter 14 may be any of the voltage converters discussed above, and is preferably a voltage converter that can output a constant voltage at an appropriate level when supplied with a voltage that swings from a peak voltage to nearly 0 volts. The most suitable voltage converter for any particular implementation will vary depending upon the characteristics of the high-energy storage capacitor that is used and the voltage operating conditions of the device(s) with which the energy storage pack is intended to be used.

Energy storage pack 10 may further include a third external contact terminal 17, which is directly coupled to internal terminal 11 of high-energy storage capacitor 12. External contact terminal 17 may be provided to enable charging of high-energy storage capacitor 12 so as to bypass voltage converter 14.

Figure 3:
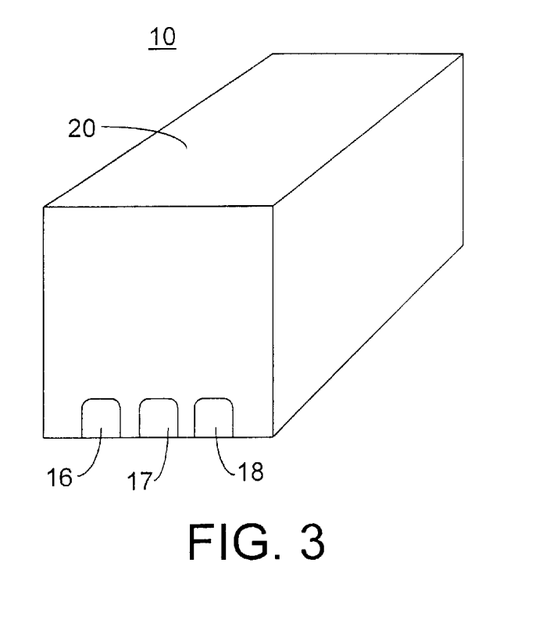
FIG. 3 is a perspective view of the energy storage device constructed in accordance with the first embodiment of the present invention.

As illustrated schematically in FIG. 2 and shown in a perspective view in FIG. 3, energy storage pack 10 includes a housing 20 in which capacitor 12 and voltage converter 14 are contained. External contact terminals 16 and 18 are preferably mounted on housing 20 so as to be accessible to the exterior of housing 20 and thereby be capable of contacting the contacts of a charger or of a device to which the energy storage pack is connected to provide power. Housing 20 may be formed in virtually any shape or dimension and external contact terminals 16 and 18 may be positioned anywhere, as may be required to operate in connection with any commercially available device. For example, housing 20 could take the shape of the housing of a standard single-cell alkaline battery, such as that shown in FIG. 7, or that of a standard 9-volt primary battery, such as that shown in FIG. 10. As used and described herein, the "standard" shape and size of a primary alkaline battery is that of a battery falling within the constraints of the American National Standards Institute (ANSI) or the International Electrotechnical Commission dimensional standards for such batteries. By shaping housing 20 in the shape and dimensions of a conventional primary battery, energy storage pack 10 may be used in devices designed to operate on primary batteries.

Figure 4:
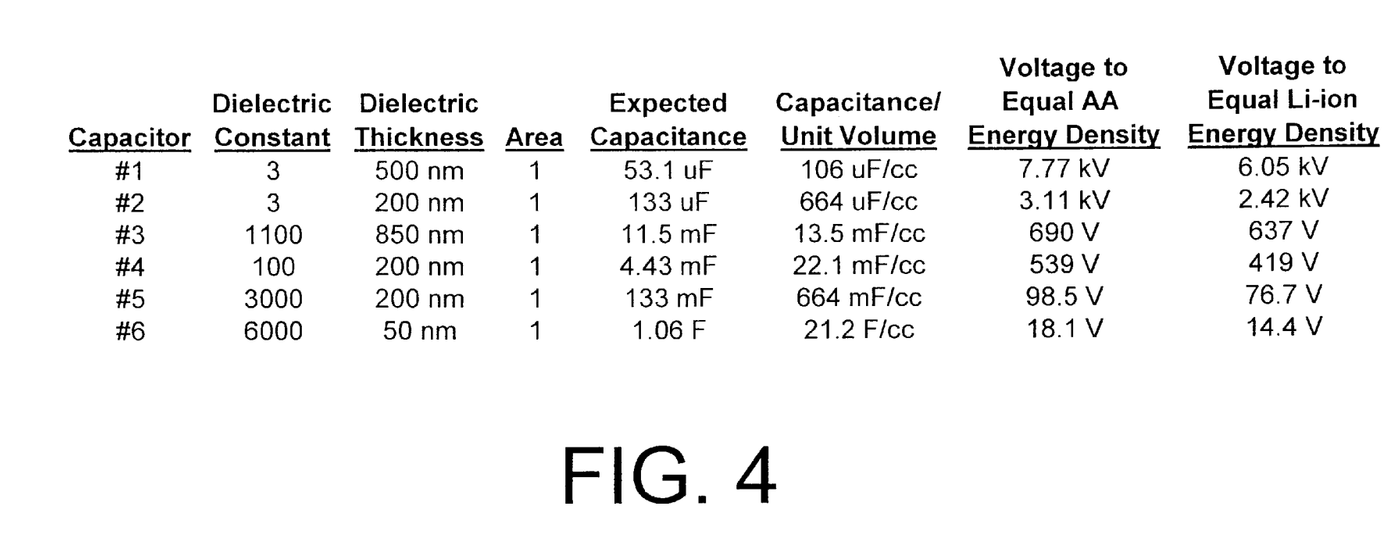
FIG. 4 is a table showing comparative energy density data for electrochemical cells and for thin film capacitors.

FIG. 4 shows energy density data for six different multi-layer thin film dielectric capacitors that may be used in the first embodiment of the present invention. Using the calculated energy densities of the electrochemical cells and super capacitors, the voltage to which each super capacitor would need to be charged to provide an energy density equal to that of the two electrochemical cells was then calculated. As shown in FIG. 4, the dielectric layer thickness (d) and a dielectric constant (k) of each capacitor was determined. The area (A) of the electrodes for each of the capacitors was selected to be 1 m². Using the equation $$C = e_0 kA/d \quad (1)$$

the expected capacitance (C) of the dielectric capacitors was determined where $e_0$ is the permittivity of free space. The expected capacitance for the listed capacitors was determined using $e_0 = 8.85 \times 10^{-12}$ F/m. The capacitance per unit volume ($C_V$) was then calculated by dividing the expected capacitance by the volume of the sample. Energy is related to voltage (V) according to the equation $$\text{Energy} = \tfrac{1}{2} C_V V^2 \quad (2)$$

The voltage required for each capacitor to have the same energy density as an AA alkaline cell was determined using equation (2). Similarly, the voltage required for each capacitor to have the same energy density as a 18650 Li-ion cell was also determined.

As shown in FIG. 4, capacitor #1 has a dielectric layer thickness of 500 nm, a dielectric constant of 3, an expected capacitance of 53.1 μF, and a capacitance per unit volume of 106 μF/cc. For a capacitor to have an energy density equal to a conventional AA alkaline electrochemical cell, the capacitor would have to have an energy density equal to 0.89 W-Hrs/cc. Thus, using equation (2) above, the voltage to which capacitor #1 would need to be charged to obtain such an energy density is 7.77 kV. For a capacitor to have an energy density equal to a conventional Li-ion electrochemical cell, the capacitor would have to have an energy density equal to 0.54 W-Hrs/cc. Thus, using equation (2) above, the voltage to which capacitor #1 would need to be charged to obtain such an energy density is 6.05 kV.

The capacitor identified in FIG. 4 as capacitor #1 corresponds to a thin film multi-layer dielectric capacitor made by Lawrence Livermore National Laboratory. An example of such a capacitor is disclosed in U.S. Pat. No. 5,486,277, the disclosure of which is incorporated herein by reference. Capacitors similar to capacitor #1 have also been made by Lawrence Livermore National Laboratory that have dielectric layer thicknesses of 200 nm and, even as low as 50 nm. Capacitor #2 shown in FIG. 4 is the same capacitor as capacitor #1 only with a dielectric layer thickness of 200 nm. The expected capacitance of such a capacitor is 133 $\mu$F, and the capacitance per unit volume is 664 $\mu$F/cc. As shown in FIG. 4, capacitor #2 would need to be charged to 3.11 kV to have the energy density of an alkaline cell, and to 2.42 kV to have the energy density of a Li-ion cell.

Alternative dielectric materials are available that have dielectric constants of up to k=6000. In FIG. 4, capacitor #3 has a dielectric layer of thickness of 850 nm and a dielectric constant of 1100. The expected capacitance of capacitor #3 is 11.5 mF, and the capacitance per unit volume is 13.5 mF/cc. As shown in FIG. 4, capacitor #3 would need to be charged to 690 volts to have the energy density of an alkaline cell, and to 637 volts to have the energy density of a Li-ion cell.

In FIG. 4, capacitors #4 and #5 are the same as capacitor #2 except that dielectric materials having dielectric constants of 100 and 3000, respectively, were substituted for the dielectric material used in capacitor #1. The dielectric material used in capacitor #5 is a ferroelectric material.

The expected capacitance of capacitor #4 is 4.43 mF, and the capacitance per unit volume is 22.1 mF/cc. As shown in FIG. 4, capacitor #4 would need to be charged to 539 volts to have the energy density of an alkaline cell, and to 419 volts to have the energy density of a Li-ion cell. The expected capacitance of capacitor #5 is 133 mF, and the capacitance per unit volume is 664 mF/cc. As shown in FIG. 4, capacitor #5 would need to be charged to 98.5 volts to have the energy density of an alkaline cell, and to 76.7 volts to have the energy density of a Li-ion cell.

Capacitor #6 includes a 50 nm thick dielectric layer having a dielectric constant of 6000. The expected capacitance of capacitor #6 is 1.06 F, and the capacitance per unit volume is 21.2 F/cc. As shown in FIG. 4, capacitor #6 would only need to be charged to 18.1 volts to have the energy density of an alkaline cell, and to 14.4 volts to have the energy density of a Li-ion cell. Dielectric materials having such a dielectric constant are formed by firing thin layers of powder rather than from layers deposited in a vacuum.

When a capacitor is used that requires a lower voltage to have an equivalent energy density, such as capacitor #6, the voltage converter used in the energy storage device may be selected from a larger number of available voltage converters thereby increasing design flexibility and possibly decreasing cost. For example, the MAX1627 DC-DC Step-Down Controller available from Maxim converts an input voltage ranging between 16.5 and 3.3 volts to a 5.0- or 3.3-volt output. In addition to the capacitors disclosed above, a suitable capacitor may be constructed as an electrochemical double layer capacitor (ECDLC) using a conductive polymer. Conductive polymers have been developed that have a capacitance per unit volume of 500 F/cc. An ECDLC constructed using such a conductive polymer would only need to be charged to about 6 volts to have an equivalent energy density to an alkaline or Li-ion battery.

An energy storage device constructed in accordance with the first embodiment offers significant advantages over conventional batteries. Specifically, the energy storage device of the present invention has a,virtually unlimited cycle life, may be recharged much more quickly than rechargeable batteries, and has better low temperature performance than batteries. Further, such energy storage devices are non-aqueous and therefore they may be constructed in virtually any shape or size as may be required by cellular telephone, video camera, and portable computer manufacturers.

Figures 5, 6, 8:
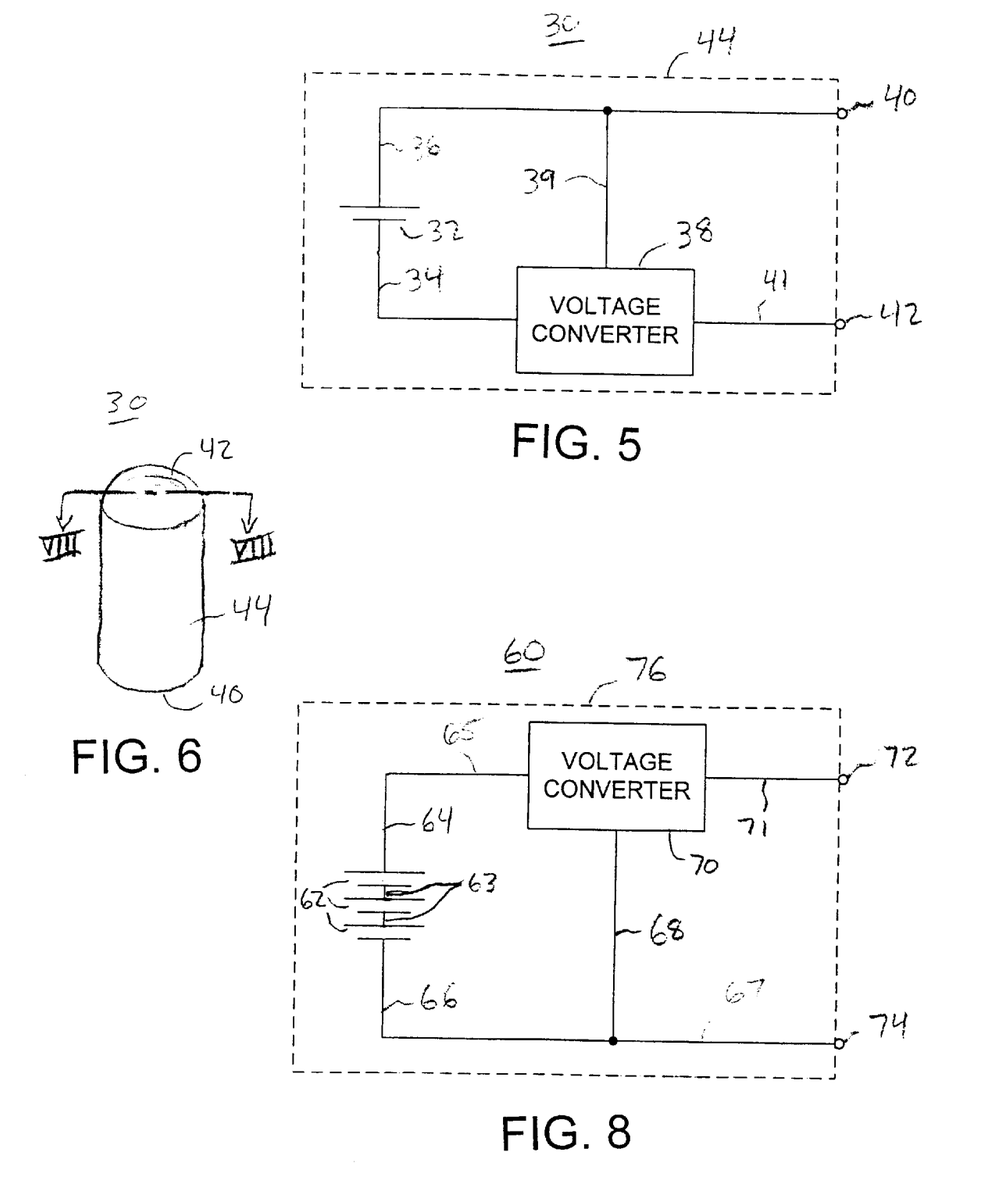
FIG. 5 is an electrical circuit diagram in block and schematic form illustrating a primary battery constructed in accordance with a second embodiment of the present invention.
FIG. 6 is a perspective view of a primary battery constructed in accordance with the second embodiment of the present invention.
FIG. 8 is an electrical circuit diagram in block and schematic form illustrating a multi-cell primary battery constructed in accordance with a third embodiment of the present invention.
Figure 7:
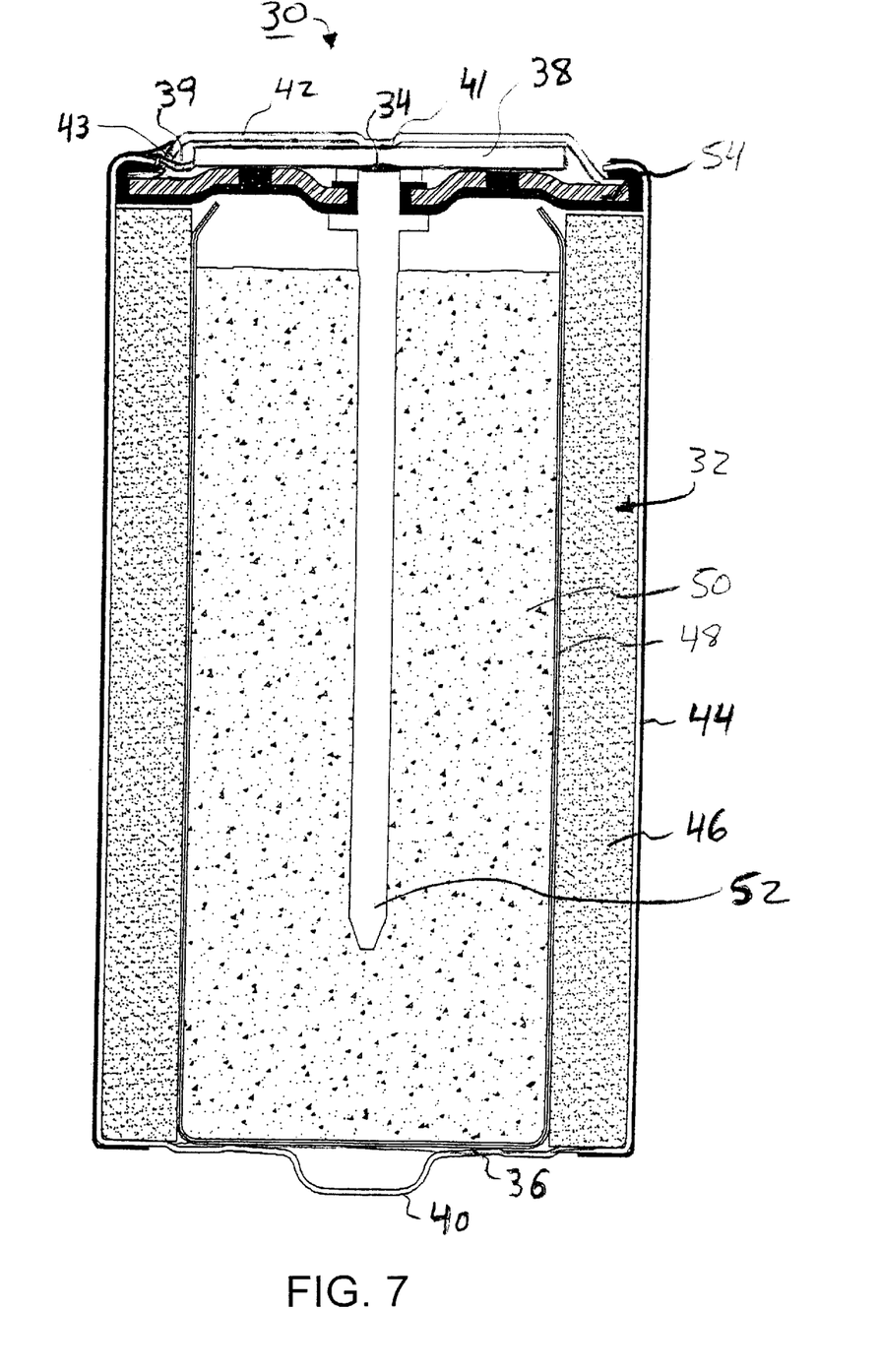
FIG. 7 is a cross-sectional view of the primary battery shown in FIG. 6 as taken along lines VII—VII.

An energy storage device 30 constructed in accordance with a second embodiment of the present invention is shown in FIGS. 5–7. As shown in FIG. 5, device 30 includes a primary electrochemical cell 32 having a negative electrode contact 34 and a positive electrode contact 36 electrically coupled to the negative and positive electrodes, respectively, of primary cell 32. Similar to a conventional alkaline battery, device 30 includes an external positive contact terminal 40 and a negative external contact terminal 42. Positive external contact terminal 40 is coupled directly to positive electrode contact 36, while negative external contact terminal 42 is coupled to negative electrode contact 34 indirectly via a voltage converter 38 and a voltage converter output connector 41. Voltage converter 38 is also coupled to positive electrode contact 36 by an electrical conductor 39. With the exception of external contact terminals 40 and 42, the above components of device 30 are all contained within housing 44.

By providing a voltage converter in a primary battery, the effective lifetime of the battery may be extended. More specifically, the voltage converter, which is preferably a step-down converter, regulates the voltage output of the battery by initially lowering the voltage appearing across the external terminals relative to the primary cell to conserve energy and maintain a constant voltage to thereby extend the useful life of the battery.

As shown in FIGS. 6 and 7, housing 44 preferably takes the form of a conventional alkaline battery. To enable device 30 to be interchanged with conventional alkaline batteries, housing 44 and contacts 40 and 42 are configured to have the same shape and size of a standard alkaline cell. Housing 44 is therefore preferably configured as an electrically conductive can having a closed end and an open end in which a collector/seal assembly 54 and negative external contact terminal 42 are secured to seal the open end of housing 44 while maintaining negative external contact terminal 42 electrically insulated from the walls of electrically conductive housing 44. Positive external contact terminal 40 may be secured in physical and electrical contact to the closed end 36 of electrically conductive housing 44.

Electrochemical cell 32 preferably includes a positive electrode 46 made of manganese dioxide ($MnO_2$), a separator layer 48, and a negative electrode 50. As is conventional and shown in FIG. 7, positive electrode 46 is formed along the interior walls of electrically conductive housing 44. Positive electrode 46 may be impact- or ring-molded. Subsequently, separator layer 48 is inserted to line the interior walls of positive electrode 46. A negative electrode/electrolyte mix 50 is then dispensed into the separator-lined interior cavity defined by positive electrode 46. The negative electrode material in mix 50 is preferably zinc, and the electrolyte is preferably potassium hydroxide (KOH) and water.

Once the negative electrode/electrolyte mix 50 has been dispensed in housing 44, the collector/seal assembly 54 is then inserted into the open end of housing 44. Preferably, collector/seal assembly 54 is constructed as shown in FIG. 7 and further described in detail in U.S. patent application Ser. No. 09/036,208, entitled COLLECTOR ASSEMBLY FOR AN ELECTROCHEMICAL CELL INCLUDING AN INTEGRAL SEAL/INNER COVER, filed on Mar. 6, 1998, by Gary R. Tucholski et al. Collector/seal assembly 54 includes a collector nail 52 that extends from a central aperture in the seal downward into the negative electrode/electrolyte mix 50 to provide an electrical connection to negative electrode mix 50. The upper end of collector nail 52 thus serves as negative electrode conductor 34. Because housing 44 is made of an electrically conductive material and because housing 44 physically and electrically contacts positive electrode 46, at least a portion of housing 44 serves as positive electrode conductor 36, which, in turn, is directly physically and electrically coupled to positive external contact terminal 40.

In a normal construction for an alkaline battery, the upper end of collector nail 52 would be directly and physically connected to negative external contact terminal 42. However, in order to regulate the voltage appearing across external terminals 40 and 42, the upper end 34 of collector nail 52 is not directly coupled to negative external contact terminal 42, but rather is coupled to a terminal of voltage converter 38. As illustrated in FIG. 6, voltage converter circuit 38 may be provided in the form of a very small integrated circuit or printed circuit board that may be positioned in a space between collector/seal assembly 54 and negative external contact terminal 42. Negative external contact terminal 42 is, in turn, connected to an output connector 41 (i.e., a terminal lead) of voltage converter 38. To ensure that voltage converter 38 has power to operate, as provided by the electrochemical cell 32, an insulated wire or lead 39 may extend from voltage converter 38 through a vent aperture 43 provided in negative external contact terminal 42 to thereby make contact to electrically conductive housing 44. Wire 39 is preferably insulated so as to avoid electrical contact with negative external contact terminal 42 that would otherwise cause a short circuit. A suitable voltage converter is the MAXIM Step-Down DC-DC Controller, Model No. MAX1626/7.

As will be more apparent from the discussion of the third embodiment below, the provision of a step-down voltage converter in a primary alkaline battery results in a substantially constant discharge voltage throughout the useful life of the primary battery. Conventional primary alkaline batteries have a voltage that gradually decreases throughout the life of the battery. Such a decrease in voltage requires that the equipment that is powered by the battery is capable of operating over the entire range of voltages output from the battery during its useful life. This problem is exacerbated when the device operates with a plurality of such batteries connected in series. As will be described further below, the "useful life" of a battery may be determined based upon the amount of time it takes for a battery to discharge below a threshold voltage. This threshold voltage may vary depending upon the various devices in which it is utilized.

Although a particular cell construction is shown in FIG. 7, it will be appreciated that other cell constructions could be utilized without departing from the scope of the present invention. For example, the cell may have a seal-less beverage can construction as disclosed in U.S. patent application Ser. No. 09/293,376 entitled "BATTERY CONSTRUCTIONS HAVING INCREASED INTERNAL VOLUME FOR ACTIVE COMPONENTS" and filed on Apr. 16, 1999, the disclosure of which is incorporated herein by reference. The particular construction shown in FIG. 7 was chosen since the collector/seal assembly 54 minimizes the space consumed within housing 44 by that component and thereby makes available additional space for voltage converter circuit 38 without requiring a reduction in the internal volume available for the electrochemically active materials. Additionally, the cell need not have the bobbin-type construction that is illustrated in FIG. 7. For example, the cell may have a spiral-wound electrode assembly (i.e., jelly roll), a stacked electrode assembly, or any other construction that exhibits a sloping discharge curve.

An energy storage device 60 constructed in accordance with a third embodiment of the present invention is shown in FIGS. 8–11. As shown schematically in FIG. 8, energy storage device 60 includes a plurality of primary electrochemical cells 62 that are all connected in series by connectors 63. Primary cells 62 are preferably alkaline or lithium cells. The series/connected electrochemical cells 62 include an internal positive terminal 64 and an internal negative terminal 66. Device 60 further includes a voltage converter 70 provided with the plurality of electrochemical cells 62 in a housing 76. Device 60 includes a positive external contact terminal 72 and a negative external contact terminal 74. Negative external contact terminal 74 is preferably directly connected to negative internal terminal 66, while positive external contact terminal 72 is preferably coupled to an output of voltage converter 70 by a conductor 71. Voltage converter 70 is coupled directly to positive internal terminal 64 and to negative internal terminal 66 by a conductive contact 68. It will be appreciated, however, that negative external contact terminal 74 may alternatively not be connected directly to negative internal terminal 66, but instead both terminals may be coupled to separate terminals of converter 70.

Figures 9, 10, 11:
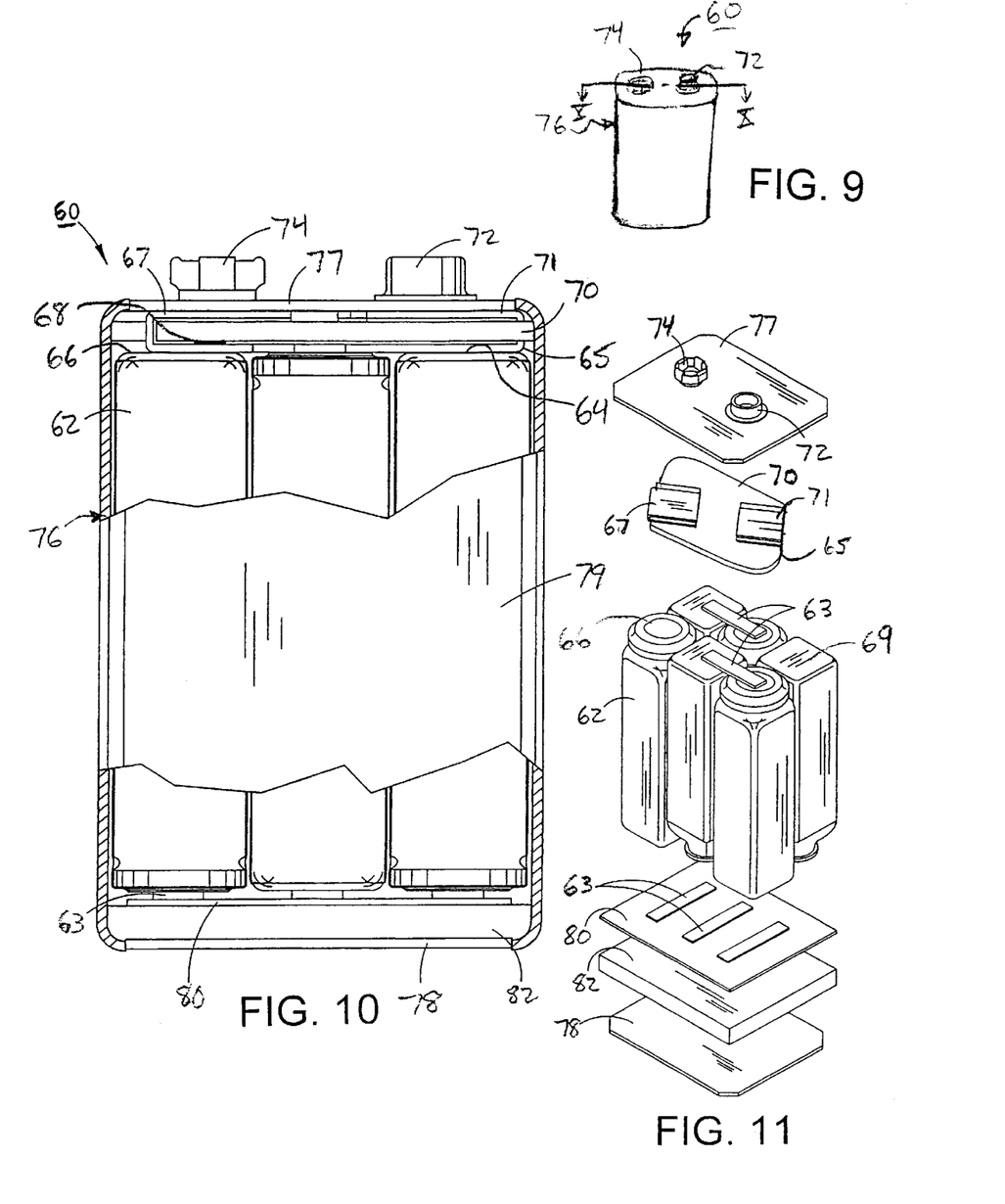
FIG. 9 is a perspective view of a multi-cell primary battery constructed in accordance with the third embodiment of the present invention.
FIG. 10 is a cross-sectional view of the multi-cell primary battery shown in FIG. 9 as taken along line X—X.
FIG. 11 is an exploded perspective view of the multi-cell primary battery shown in FIG. 10.

As shown in FIGS. 9–11, housing 76 and external contact terminals 72 and 74 may be configured to be shaped and sized as a conventional 6- or 9-volt alkaline battery. As shown in FIGS. 10 and 11, housing 76 includes an upper plate 77, a lower plate 78, and a side member 79 that extends between top and bottom plate 77 and 78. On the interior surface of lower plate 78, a rigid plate 80, having three intercell connectors 63, is provided on its upper surface. A resilient foam pad 82 or the like is provided between plates 78 and 80 for purposes described below. The electrochemical cells 62 are arranged in a manner similar to that shown in FIG. 11 so as to be inserted in housing 76 with an end of each cell 62 being in physical and electrical contact with one of the three intercell connectors 63 on plate 80. Two additional intercell connectors 63 are provided along the tops of four of the six cells to provide a complete series connection between all of the cells. With such an arrangement, the two cells that do not have their upper ends connected to one of connectors 63 serve as the internal positive and negative internal contacts 64 and 66, respectively.

Voltage converter 70 is provided on a circuit board that is inserted on top of cells 62 while underlying upper plate 77 within the interior of housing 76. The circuit board carrying voltage converter 70 includes at one end a conductive strip 67 that wraps around the edge of the circuit board to provide a direct electrical connection between internal negative contact 66 and external negative contact terminal 74. A contact terminal 68 is provided between conductive strip 67 and voltage converter 70. The circuit board carrying voltage converter 70 also includes on one side of the end opposite strip 67 a conductive strip 65 that contacts positive internal terminal 64 and connects to voltage converter 70. On the opposite side of strip 65, a second strip 71 is provided that connects voltage converter 70 to external positive contact terminal 72. Resilient pad 82 is provided between plates 78 and 80 to push plate 80, cells 62, and strips 67 and 71 firmly against each other and external contact terminals 72 and 74.

Although FIGS. 10 and 11 show a specific internal construction for such a multi-cell battery, it will be appreciated that other constructions for multi-cell batteries may be employed without departing from the spirit and scope of the present invention. Further, voltage converter 70 may be secured to the outside of housing 76.

Figure 12A:
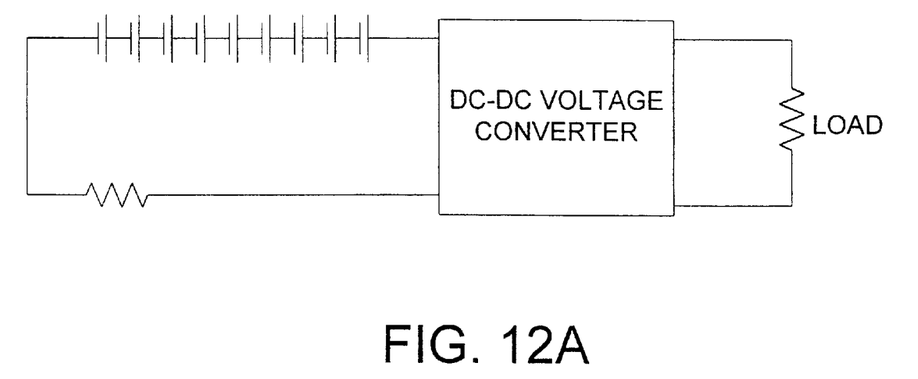
FIG. 12A is an electrical circuit diagram in block and schematic form illustrating a test circuit for a multi-cell primary battery constructed in accordance with the third embodiment of the present invention.
Figure 12B:
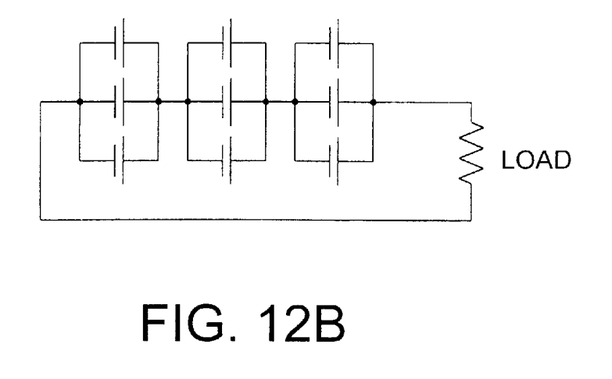
FIG. 12B is an electrical circuit diagram in block and schematic form illustrating a test circuit for a comparative multi-cell primary battery.

To illustrate the advantages of utilizing a voltage converter in a multi-cell primary battery, two circuits were constructed as illustrated in FIGS. 12A and 12B so as to generate comparative discharge curves and data for a multi-cell primary battery utilizing a voltage converter (FIG. 12A) and a multi-cell primary battery that does not utilize a voltage converter (FIG. 12B).

With specific reference to FIG. 12A, nine AA cells were connected in series with a minimal 0.1 Ω resistor connected in series with the nine AA cells so that the current being supplied to the controller could be measured. The nine cells and 0.1 Ω resistor were 20 connected to the input terminals of a Maxim Step-Down DC-DC Controller, Model No. MAX1626/7 as the voltage converter. At the output of the voltage converter, a load resistor was connected to discharge the AA cells. As explained further below, different AA cells were utilized for different tests as were different load resistances.

FIG. 12B shows the circuit construction for the comparative multi-cell primary battery that does not utilize a voltage converter. As shown, nine AA cells were connected whereby the nine cells were grouped into three subsets of cells that each include three cells connected in parallel. The three subsets of cells were then connected in series with one another and connected to a load resistor.

Figure 13:
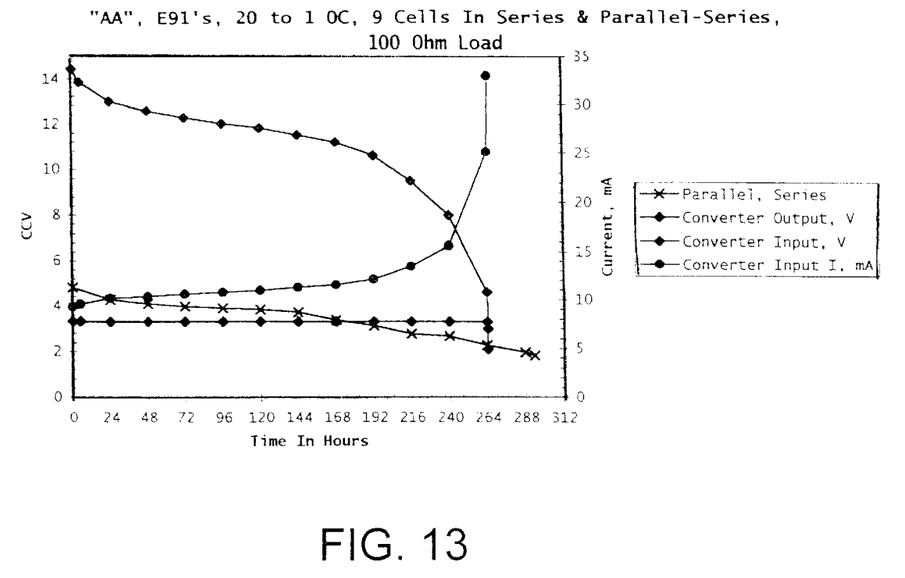
FIG. 13 is a graph illustrating the discharge voltage and current for the circuit shown in FIGS. 12A and 12B according to a first test.

For a first comparative test, nine E91 alkaline AA cells were used in each of the circuits shown in FIGS. 12A and 12B. The load resistor had a resistance of 100 Ω. The voltage and current appearing at the input terminals of the voltage controller were then measured for the circuit shown in FIG. 12A as was the output voltage appearing across the load resistor. For the circuit shown in FIG. 12B, the voltage appearing across the load resistor was measured. These measurements are shown in Table 1 below, and are shown in the graph of FIG. 13. As evident from viewing the graph shown in FIG. 13, the voltage of the nine cells in the circuit of FIG. 12A was significantly higher than the voltage of the nine cells in the circuit shown in FIG. 12B. However, the voltage controller maintained an output voltage across the load resistance at a constant value of 3.3 volts. The time that it took for the output voltage appearing across the load resistors to fall below 3.3 volts was utilized as a threshold for determining the useful life of the multi-cell batteries. With this first test, the nine cell battery having a voltage converter (FIG. 12A) took approximately 264 hours to fall to a voltage below 3.3 volts whereas the most favorable arrangement of nine cells in a battery that do not utilize a voltage converter (FIG. 12B) fell below 3.3 volts after approximately 170 hours. Thus, the use of the voltage converter significantly improved the useful life of the battery.

TABLE 1

| | WITH CONVERTER | | | NO CONVERTER |
|---|---|---|---|---|
| Time | Converter Input Voltage | Converter Input Current (mA) | Output Voltage | Output Voltage |
| 0 | 14.45 | 9.2 | 3.32 | 4.81 |
| 5 | 13.85 | 9.5 | 3.32 | |
| 24 | 13.01 | 10.1 | 3.31 | 4.27 |

TABLE 1-continued

| | WITH CONVERTER | | | NO CONVERTER |
|---|---|---|---|---|
| Time | Converter Input Voltage | Converter Input Current (mA) | Output Voltage | Output Voltage |
| 48 | 12.6 | 10.3 | 3.31 | 4.09 |
| 72 | 12.3 | 10.5 | 3.31 | 3.979 |
| 96 | 12.04 | 10.7 | 3.31 | 3.902 |
| 120 | 11.84 | 10.9 | 3.31 | 3.84 |
| 144 | 11.53 | 11.2 | 3.3 | 3.71 |
| 168 | 11.19 | 11.5 | 3.3 | 3.387 |
| 192 | 10.59 | 12.1 | 3.3 | 3.12 |
| 216 | 9.5 | 13.4 | 3.3 | 2.767 |
| 240 | 8.01 | 15.6 | 3.3 | 2.663 |
| 264 | 4.6 | 25.1 | 3.3 | 2.27 |
| 264.72 | 3.0 | 33 | 2.1 | |
| 288 | | | | 1.95 |
| 294 | | | | 1.825 |

Figure 14:
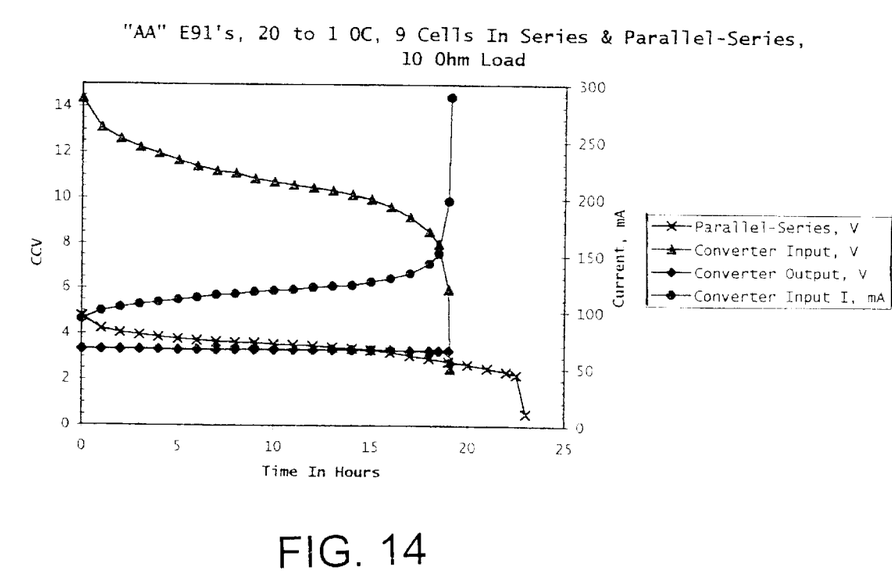
FIG. 14 is a graph illustrating the discharge voltage and current for the circuit shown in FIGS. 12A and 12B according to a second test.

In a second test, the nine batteries utilized in circuits 13a and 13b where again E91 alkaline AA cells. However, unlike the first test, the load resistance was set at 10 Ω so as to discharge the batteries at a much higher rate. The results of the second test are shown in Table 2 below and depicted graphically in FIG. 14. As shown, the multi-cell battery having a voltage converter took approximately 19 hours to fall below 3.3 volts, whereas the multi-cell battery without voltage converter fell below 3.3 volts in approximately 15 hours.

TABLE 2

| | WITH CONVERTER | | | NO CONVERTER |
|---|---|---|---|---|
| Time | Converter Input Voltage | Converter Input Current (mA) | Output Voltage | Output Voltage |
| 0 | 14.36 | 93 | 3.33 | 4.76 |
| 1 | 13.1 | 100 | 3.32 | 4.24 |
| 2 | 12.6 | 103 | 3.32 | 4.06 |
| 3 | 12.22 | 106 | 3.32 | 3.95 |
| 4 | 11.94 | 108 | 3.32 | 3.86 |
| 5 | 11.65 | 110 | 3.31 | 3.775 |
| 6 | 11.4 | 112 | 3.31 | 3.72 |
| 7 | 11.2 | 114 | 3.3 | 3.67 |
| 8 | 11.1 | 115 | 3.31 | 3.63 |
| 9 | 10.85 | 117 | 3.31 | 3.6 |
| 10 | 10.7 | 118 | 3.31 | 3.55 |
| 11 | 10.58 | 119 | 3.3 | 3.515 |
| 12 | 10.45 | 121 | 3.3 | 3.475 |
| 13 | 10.33 | 122 | 3.3 | 3.425 |
| 14 | 10.16 | 123 | 3.3 | 3.375 |
| 15 | 9.96 | 126 | 3.3 | 3.3 |
| 16 | 9.65 | 129 | 3.3 | 3.21 |
| 17 | 9.2 | 134 | 3.29 | 3.075 |
| 18 | 8.56 | 143 | 3.29 | 2.96 |
| 18.5 | 8.01 | 152 | 3.29 | |
| 19 | 5.99 | 198 | 3.29 | 2.82 |
| 19.1 | 2.5 | 289 | 2.75 | |
| 20 | | | | 2.675 |
| 21 | | | | 2.52 |
| 22 | | | | 2.36 |
| 22.5 | | | | 2.24 |
| 23 | | | | 0.56 |

Figure 15:
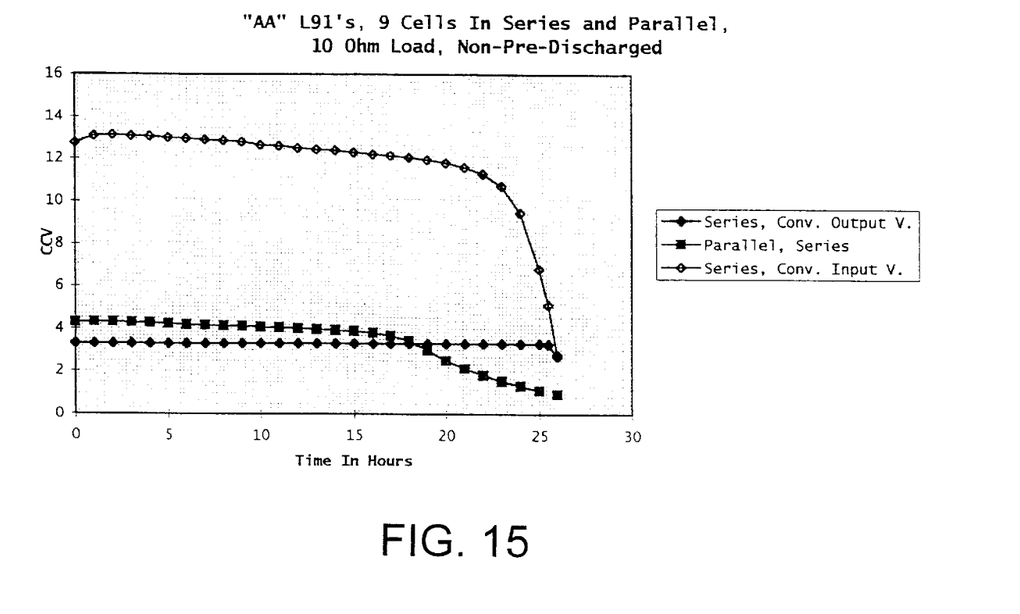
FIG. 15 is a graph illustrating the discharge voltage and current for the circuit shown in FIGS. 12A and 12B according to a third test.

A third test was conducted that was substantially the same as the second test except that the nine cells used in both circuits were L91 AA primary lithium batteries. The results of the test are shown in Table 3 below and shown graphically in FIG. 15. As shown from the test data, the multi-cell battery having a voltage converter took over 25 hours to fall below 3.3 volts, whereas the multi-cell battery not having a voltage converter took less than 19 hours to discharge below 3.3 volts.

TABLE 3

| | WITH CONVERTER | | NO CONVERTER |
| --- | --- | --- | --- |
| Time | Converter Input Voltage | Output Voltage | Output Voltage |
| 0 | 12.76 | 3.32 | 4.3 |
| 1 | 13.1 | 3.32 | 4.32 |
| 2 | 13.14 | 3.32 | 4.32 |
| 3 | 13.1 | 3.32 | 4.29 |
| 4 | 13.07 | 3.32 | 4.27 |
| 5 | 13.0 | 3.32 | 4.23 |
| 6 | 12.97 | 3.32 | 4.2 |
| 7 | 12.9 | 3.32 | 4.18 |
| 8 | 12.85 | 3.32 | 4.16 |
| 9 | 12.8 | 3.32 | 4.13 |
| 10 | 12.65 | 3.32 | 4.1 |
| 11 | 12.6 | 3.32 | 4.06 |
| 12 | 12.51 | 3.32 | 4.03 |
| 13 | 12.44 | 3.32 | 3.99 |
| 14 | 12.39 | 3.32 | 3.95 |
| 15 | 12.3 | 3.32 | 3.9 |
| 16.05 | 12.2 | 3.32 | 3.81 |
| 17 | 12.15 | 3.32 | 3.68 |
| 18 | 12.05 | 3.32 | 3.44 |
| 19 | 11.95 | 3.32 | 3.0 |
| 20 | 11.8 | 3.32 | 2.5 |
| 21 | 11.6 | 3.32 | 2.13 |
| 22 | 11.3 | 3.31 | 1.82 |
| 23 | 10.74 | 3.31 | 1.54 |
| 24 | 9.47 | 3.3 | 1.32 |
| 25 | 6.84 | 3.3 | 1.11 |
| 25.5 | 5.14 | 3.29 | |
| 26 | 2.8 | 2.725 | 0.94 |

The above description is considered that of the preferred embodiments only. Modifications of the invention will occur to those skilled in the art and to those who make or used the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A self-contained portable energy storage device comprising:
   a housing having first and second external contact terminals and containing no battery cells;
   a high-energy storage capacitor disposed in said housing and coupled between first and second internal terminals; and
   a voltage converter disposed in said housing, coupled to said first and second internal terminals, and coupled to said first and second external contact terminals for converting the voltage appearing at said first and second internal terminals to a substantially constant voltage that said voltage converter applies to said first and second external contact terminals.

2. The self-contained portable energy storage device as defined in claim 1, wherein said housing has dimensions corresponding to a standard battery.

3. The self-contained portable energy storage device as defined in claim 1 and further including a third external contact terminal coupled to one of said first and second internal terminals for engaging a contact terminal of a charger and thereby enabling said voltage converter to be bypassed during charging of said high-energy storage capacitor.

4. The self-contained portable energy storage device as defined in claim 1, wherein said high-energy storage capacitor is a multi-layer thin-film dielectric capacitor.

5. The self-contained portable energy storage device as defined in claim 1, wherein said high-energy storage capacitor is an electrochemical double layer capacitor.

6. The energy storage device as defined in claim 1, wherein said voltage applied to the first and second external contact terminals is less than said voltage at the first and second internal terminals.

7. A self-contained portable energy storage device comprising:
   a housing having first and second external contact terminals;
   a self-contained energy source for providing a voltage, said energy source disposed in said housing, coupled between first and second internal terminals and consisting of a high-energy storage capacitor device; and
   a voltage converter, coupled to said first and second internal terminals and coupled to said first and second external contact terminals, for converting said voltage from the energy source and appearing at said first and second internal terminals to a substantially constant voltage that said voltage converter applies to said first and second external contact terminals; wherein
   said self-contained energy source is a sole internal energy source for said voltage applied to the first and second external contact terminals.

8. The energy storage device as defined in claim 7, wherein said high-energy storage capacitor device consists of at least one capacitor selected from the group consisting of super capacitors, multiple layer thin film capacitors, double layer capacitors and electrochemical double layer capacitors.

9. The energy storage device as defined in claim 7 and further including a third external contact terminal coupled to one of said first and second internal terminals for engaging a contact terminal of a charger and thereby enabling said voltage converter to be bypassed during charging of said high-energy storage capacitor.

10. The energy storage device as defined in claim 7, wherein said voltage applied to the first and second external contact terminals is less than said voltage from the energy source.

11. The energy storage device as defined in claim 7, wherein said voltage converter is disposed in said housing.

12. The energy storage device as defined in claim 7, wherein said voltage converter is disposed outside said housing.

13. A self-contained portable energy storage device comprising:
   a housing having first and second external contact terminals;
   a self-contained capacitor device disposed in said housing and coupled between first and second internal terminals; and
   a voltage converter; wherein:
      said capacitor device is capable of providing a voltage between said first and second external contact terminals;
      said voltage converter is coupled to said first and second internal terminals, and coupled to said first and second external contact terminals, for converting said voltage between the first and second internal terminals to a substantially constant voltage that said voltage converter applies to said first and second external contact terminals; and said capacitor device is capable of being charged by only an external energy source and is a sole internal energy source for said voltage applied to the first and second external contact terminals.

14. The energy storage device as defined in claim 13, wherein said capacitor device consists of at least one capacitor selected from the group consisting of super capacitors, multiple layer thin film capacitors, double layer capacitors and electrochemical double layer capacitors.

15. The self-contained portable energy storage device as defied in claim 13 and further including a third external contact terminal coupled to one of said first and second internal terminals for engaging a contact terminal of a charger and thereby enabling said voltage converter to be bypassed during charging of said capacitor device.

16. The energy storage device as defined in claim 13, wherein said voltage applied to the first and second external contact terminals is less than said voltage from the capacitor device.

17. The energy storage device as defined in claim 13, wherein said voltage converter is disposed in said housing.

18. The energy storage device as defined in claim 13, wherein said voltage converter is disposed outside said housing.

* * * * *